United States Patent
Umemoto et al.

(10) Patent No.: US 10,781,132 B2
(45) Date of Patent: Sep. 22, 2020

(54) GLASS CERAMICS SINTERED BODY AND COIL ELECTRONIC COMPONENT

(71) Applicant: TDK CORPORATION, Tokyo (JP)

(72) Inventors: Shusaku Umemoto, Tokyo (JP); Takashi Suzuki, Tokyo (JP); Hidekazu Sato, Tokyo (JP); Masaki Takahashi, Tokyo (JP); Shinichi Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 384 days.

(21) Appl. No.: 15/887,281

(22) Filed: Feb. 2, 2018

(65) Prior Publication Data

US 2018/0230040 A1    Aug. 16, 2018

(30) Foreign Application Priority Data

Feb. 15, 2017    (JP) .................................. 2017-025662

(51) Int. Cl.

| | |
|---|---|
| *H01F 27/29* | (2006.01) |
| *C03C 14/00* | (2006.01) |
| *C03C 10/00* | (2006.01) |
| *C03C 3/093* | (2006.01) |
| *C03C 4/16* | (2006.01) |
| *H01F 27/32* | (2006.01) |

(52) U.S. Cl.
CPC ............ *C03C 14/004* (2013.01); *C03C 3/093* (2013.01); *C03C 4/16* (2013.01); *C03C 10/0054* (2013.01); *H01F 27/29* (2013.01); *C03C 2214/04* (2013.01); *C03C 2214/20* (2013.01); *H01F 27/323* (2013.01)

(58) Field of Classification Search
CPC .... H01F 27/323; H01F 27/29; H01F 27/2804; C03C 14/004; C03C 2214/04; C03C 2214/20
USPC ......................................... 336/200, 232, 233
See application file for complete search history.

(56) References Cited

U.S. PATENT DOCUMENTS

| | | |
|---|---|---|
| 2003/0170436 A1 | 9/2003 | Sumi et al. |
| 2003/0224923 A1 | 12/2003 | Cho et al. |
| 2006/0075782 A1* | 4/2006 | Watanabe ........... C03C 10/0036 65/42 |
| 2006/0083930 A1 | 4/2006 | Sumi et al. |

(Continued)

FOREIGN PATENT DOCUMENTS

| | | | |
|---|---|---|---|
| CN | 1446768 A | 10/2003 | |
| DE | 10223889 A1 * | 1/2003 | ............. C03C 3/091 |

(Continued)

*Primary Examiner* — Tszfung J Chan
(74) *Attorney, Agent, or Firm* — Oliff PLC (57) ABSTRACT

Provided is a glass ceramics sintered body including a glass phase and a ceramics phase dispersed in the glass phase, in which the ceramics phase includes alumina grains and zirconia grains, the glass phase includes an $MO-Al_2O_3-SiO_2-B_2O_3$ based glass, in which "M" is an alkaline earth metal, and an area ratio of the alumina grains is 0.05 to 12% and the area ratio of the zirconia grains is 0.05 to 6% on the cross section of the sintered body. According to the invention, a glass ceramics sintered body, capable of a low temperature sintering having a low dielectric constant and a sufficient strength, and a coil electronic component using thereof can be provided.

8 Claims, 3 Drawing Sheets

(56) References Cited

U.S. PATENT DOCUMENTS

| | | | |
|---|---|---|---|
| 2011/0079412 A1* | 4/2011 | Imakita | C03C 12/00 174/50 |
| 2011/0181384 A1* | 7/2011 | Inuduka | H01F 17/0013 336/234 |
| 2014/0145816 A1* | 5/2014 | Sato | H01F 17/0013 336/208 |
| 2014/0153262 A1* | 6/2014 | Ohta | H01L 23/15 362/382 |
| 2014/0220364 A1 | 8/2014 | Umemoto et al. | |
| 2016/0229738 A1 | 8/2016 | Umemoto et al. | |

FOREIGN PATENT DOCUMENTS

| | | | | |
|---|---|---|---|---|
| JP | H07-048171 A | | 2/1995 | |
| JP | 11106234 A | * | 4/1999 | C03C 8/04 |
| JP | 2000-236147 A | | 8/2000 | |
| JP | 2004-269269 A | | 9/2004 | |
| JP | 2007-015878 A | | 1/2007 | |
| JP | 2013-062459 A | | 4/2013 | |
| JP | 2014-152059 A | | 8/2014 | |
| JP | 2016-155746 A | | 9/2016 | |
| KR | 10-2011-0037851 A | | 4/2011 | |
| TW | 200307653 A | | 12/2003 | |
| TW | 201315706 A | | 4/2013 | |
| WO | WO-2013133300 A1 | * | 9/2013 | C03C 12/00 |

\* cited by examiner

GLASS CERAMICS SINTERED BODY AND COIL ELECTRONIC COMPONENT

BACKGROUND OF THE INVENTION

1. Field of the Invention

The present invention relates to a glass ceramics sintered body having a low dielectric constant and sufficient strength, which is particularly suitably used as a coil material and can be manufactured by sintering at a low temperature, and to a coil electronic component using thereof.

2. Related Art

In recent years, with increase in the frequency of communication devices such as cellular phones, many of the ceramic coils applicable for high frequencies are adopted in these transmission units and reception units. Among these ceramic coils, high frequency inductors used particularly for smart phones and the like are required to be miniaturized and to be applicable for high frequencies, and to have a high Q value. In case when the stray capacitance of the inductor is large, the self-resonance frequency is lowered, and the function as the inductor in the high-frequency region sometimes deteriorates remarkably. In addition, in order to apply an Ag based conductor having low resistance and low loss as the internal electrode, sinterability at a low-temperature may be required.

Therefore, as a material of the ceramic coil, a glass based material having a low dielectric constant is generally used. $SiO_2$ having a dielectric constant "c" of approximately 3.8 is generally known as a low dielectric constant glass based material. However, since $SiO_2$ does not sinter at 960° C. or lower, its use is restricted when an Ag based conductor having a melting point of approximately 960° C. is used as the internal electrode. Therefore, a coil material capable of sintering at a low temperature is desired.

The use of glass based materials composed of borosilicate glass ($\varepsilon$:3.8) as a glass based material that has the low dielectric constant and is promising for the low temperature sintering was investigated. This material can be sintered at 900° C. or less and it is considered promising for low temperature sintering. However, when this material is used as a base material of the coil electronic component such as a ceramic coil, there may arise a problem that scratches or the like formed on the surface of the element body become the crack generation, and the strength only lower than the originally expected strength is exerted.

Therefore, in order to improve the strength of the glass based material, use of a glass ceramics in which a filler is added to the glass based material has been studied. As the filler, $Al_2O_3$ (alumina) is widely used. The filler needs to have affinity with a glass phase and wettability. From this point of view, alumina is one of the promising filler materials.

However, the surface roughness of the internal electrode in contact with the glass phase is increased by adding the filler. Since the conduction of the internal electrode is dominated by a surface conduction, an undesirable increase in surface roughness leads to an increase in resistance. Particularly in a multilayer chip inductor in which miniaturization and thinning are progressing, the surface state of the internal electrode has a serious influence on the Q value. In addition, the dielectric constant "$\varepsilon$" of alumina is approximately 10, and the addition of the filler inevitably increases the dielectric constant.

As described above, although the addition of the filler is promising from the viewpoint of improving the strength of the coil element, from the viewpoint of electrical characteristics, it is desired to suppress the mixing amount of the filler. Therefore, it is demanded to develop the filler which can contribute to strength improvement with a smaller mixing amount and does not excessively raise a sintering temperature.

As the low-temperature sinterable glass ceramic composition, Patent Document 1 (JP2007-15878A) discloses the following ceramic composition aiming to improve acid resistance. Disclosed is a ceramic composition including 40 to 80 wt % of borosilicate glass powder and 60 to 20 wt % of ceramic powder, in which the borosilicate glass powder, containing 28 to 50 wt % of $SiO_2$, 36 to 55 wt % of MO (MO is at least one of CaO and MgO), 0 to 20 wt % of $Al_2O_3$, and 5 to 17.5 wt % of $B_2O_3$, and the ceramic powder, containing 1 wt % or more of $ZrO_2$, are mixed.

In addition, Patent Document 1 also describes that the ceramic powder may include $Al_2O_3$ in addition to $ZrO_2$. That is, this document discloses a glass ceramics composition containing $ZrO_2$ and $\alpha$-$Al_2O_3$ as the ceramic powder, which is the filler. The amount of the filler added is at least 20 wt %. This document also describes the transverse strength (bending strength) of the substrate made of the ceramic composition.

The ceramic composition of Patent Document 1 contains a relatively large amount of $ZrO_2$ effective for improving acid resistance for the purpose of improving acid resistance. Also, it contains 20 wt % or more of the ceramic powder composed of $ZrO_2$ and $Al_2O_3$. Although $ZrO_2$ is effective for improving strength and acid resistance, it increases the dielectric constant. $Al_2O_3$ also increases the dielectric constant of the glass based material. Although this document does not mention about the dielectric constant of the ceramic composition, it is presumed to have a high dielectric constant since it contains a large amount of the filler, which is not suitable for the use in a high frequency region.

PRIOR ART

Patent Document 1: JP 2007-15878A

The present invention has been made considering such circumstances, and an object of the present invention is to provide a glass ceramics sintered body, capable of a low-temperature sintering and having a low dielectric constant and a sufficient strength, and a coil electronic component using thereof.

SUMMARY OF THE INVENTION

As a result of intensive research, the present inventors have found that the improvement of strength can be achieved by sintering at a relatively low temperature without excessively increasing the dielectric constant by including specific amounts of alumina and zirconia as fillers (a ceramics phase) in the glass phase having a specific composition, which lead to a completion of the invention.

Namely, the summary of the present invention is as follows.

(1) A glass ceramics sintered body including a glass phase and a ceramics phase dispersed in the glass phase, in which the ceramics phase includes alumina grains and zirconia grains, the glass phase includes an MO-$Al_2O_3$—$SiO_2$—$B_2O_3$ based glass, in which "M" is an alkaline earth metal, and an area ratio of the alumina grains is 0.05 to 12% and the area ratio of the zirconia grains is 0.05 to 6% on the cross section of the sintered body.

(2) The glass ceramics sintered body according to (1), in which

95% or more of the alumina grains are in the range of 0.05 to 4 μm by a circle equivalent diameter, and 95% or more of the zirconia grains are in the range of 0.05 to 1 μm by the circle equivalent diameter, on the cross section of the sintered body.

(3) The glass ceramics sintered body according to (1) or (2), in which the ceramics phase further includes silica grains, and the area ratio of the silica grains is 25 to 45% on the cross section of the sintered body.

(4) The glass ceramics sintered body according to (3), in which

95% or more of the silica grains are in the range of 0.2 to 4 μm by the circle equivalent diameter on the cross section of the sintered body.

(5) The glass ceramics sintered body according to any one of (1) to (4), in which the glass phase includes;

4 to 14 mass % of MO, in which "M" is the alkaline earth metal, 3 to 10 mass % of $Al_2O_3$, 70 to 90 mass % of $SiO_2$, 2 to 12 mass % of $B_2O_3$, and 2 mass % or less of $ZrO_2$.

(6) The glass ceramics sintered body according to any one of (1) to (5), in which MO includes CaO and SrO.

(7) A coil element including the glass ceramics sintered body according to any one of (1) to (6).

(8) A coil electronic component including a ceramics layer made of the glass ceramics sintered body according to any one of (1) to (6).

(9) An electronic component formed by laminating a coil conductor and the ceramic layer, in which the coil conductor includes Ag, and the ceramics layer is made of the glass ceramics sintered body according to any one of (1) to (6).

According to the present invention, a glass ceramics sintered body having a sufficient strength even when dielectric constant is low and sintering temperature is low despite of containing alumina and zirconia as the filler is provided.

EMBODIMENTS FOR CARRYING OUT THE INVENTION

Modes (embodiments) for carrying out the present invention will be described in detail referring to the drawings; however, the present invention is not limited only to the embodiments described below. In addition, the constituents described below include modifications or analogues which can easily be assumed by those skilled in the art. Further, the constituents described below can be appropriately combined.

(Coil Electronic Component)

Figure 1:
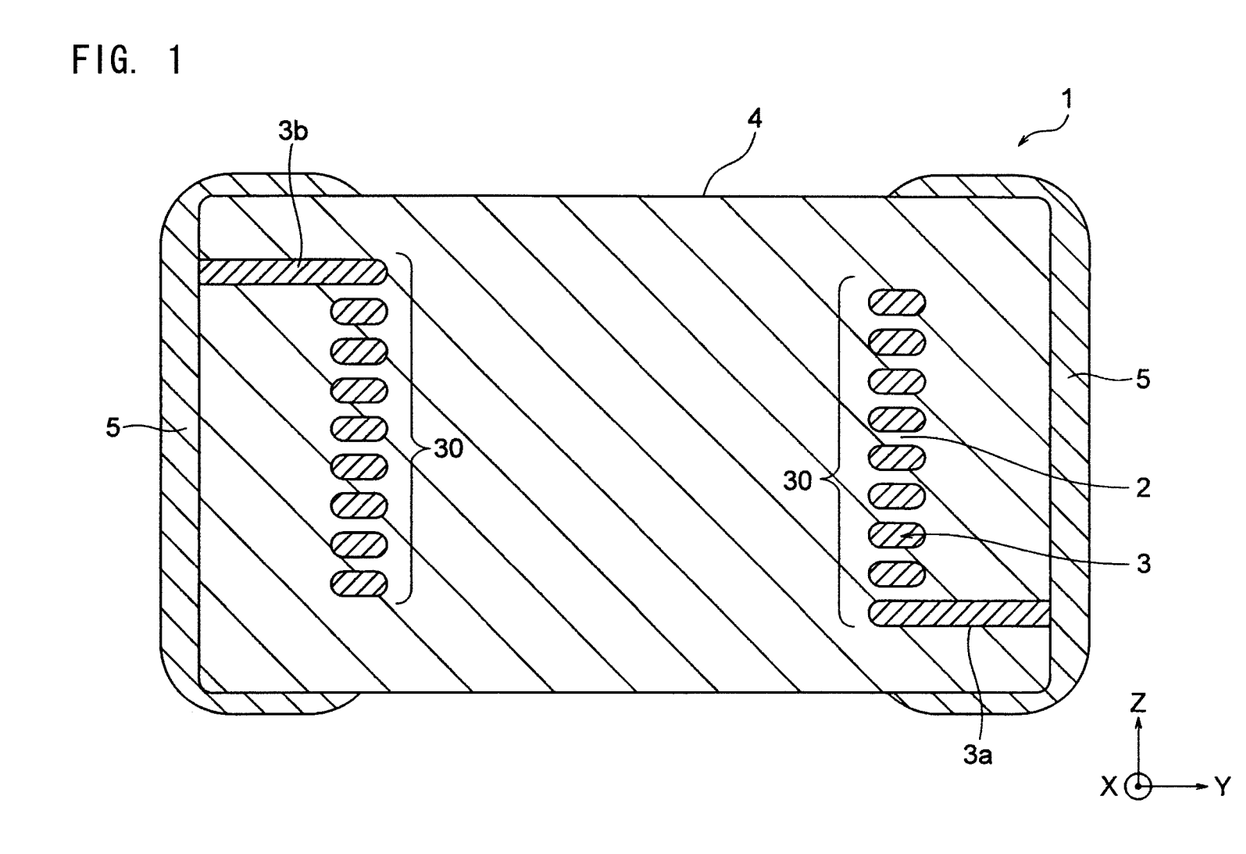
FIG. 1 is a cross-sectional view of the multilayer chip coil as the coil electronic component according to an embodiment of the present invention.

FIG. 1 shows a multilayer chip coil 1 as an example of a coil electronic component according to an embodiment of the invention. The multilayer chip coil 1 has a chip element body 4, in which ceramics layers 2 and internal electrode layers 3 are alternately laminated in the Z axis direction.

Each of the internal electrode layers 3 has a square ring shape, a C shape, or a U shape. The internal electrode layers 3 are connected in a spiral manner by through hole electrodes (not shown) or stepped electrodes, installed for connecting the internal electrodes and penetrate the adjacent ceramics layers 2, and constitute coil conductor 30.

Terminal electrodes 5 are respectively formed at both ends of the chip element body 4 in the Y axis direction. Ends of the extracting electrodes 3a, 3b positioned above and below in the Z-axis direction are connected to each terminal electrode 5. Terminal electrodes 5 are connected to both ends of the coil conductor 30 constituting a closed magnetic circuit coil (winding pattern).

In the present embodiment, the lamination direction of the ceramics layers 2 and the internal electrode layers 3 agrees with the Z axis, and the surface of the terminal electrode 5 is parallel to the X axis and the Y axis. The X axis, the Y axis, and the Z axis are mutually perpendicular. In the multilayer chip coil 1 shown in FIG. 1, the winding axis of the coil conductor 30 substantially agrees with the Z axis.

The external shape and the size of the chip element body 4 are not particularly limited and can be appropriately set according to the application. In general, the external shape is approximately a rectangular parallelepiped shape, and for example, the size is 0.1 to 0.8 mm in the X axis direction, 0.2 to 1.6 mm in the Y axis direction, and 0.1 to 1.0 mm in Z axis direction.

A thickness between electrodes and a base thickness of the ceramics layers 2 are not particularly limited, and the thickness between electrodes (a gap between the internal electrode layers 3, 3) may be set to approximately 3 to 50 μm, and the base thickness (a distance between the extracting electrodes 3a, 3b to the end of the chip element body 4 in the Z axis direction) to approximately 5 to 300 μm.

In the present embodiment, the terminal electrode 5 is not particularly limited, and can be formed by adhering a conductive paste, mainly including Ag, Pd, and etc., to the outer surface of the element body 4, baking thereof, and then electroplating thereof. Cu, Ni, Sn, and etc. can be used for the electroplating.

The coil conductor 30 preferably includes Ag, including an alloy of Ag, and is made of such as Ag alone, Ag—Pd alloy, and etc. In addition, Zr, Fe, Mn, Ti, and oxides thereof can be included as a subcomponent of the coil conductor.

The ceramics layers 2 are composed of the glass ceramics sintered body according to an embodiment of the invention. Hereinafter, the glass ceramics sintered body will be described in detail.

(Glass Ceramics Sintered Body)

The glass ceramics sintered body according to the present embodiment includes the glass phase of a specific composition and the ceramics phase dispersed in the glass phase. The ceramics phase includes alumina grains and zirconia grains. In the glass ceramics sintered body according to the present embodiment, the ceramics phase dispersed in the glass phase can be observed on the cross section of the sintered body.

The area ratio of the alumina grains on the cross section of the sintered body is 0.05 to 12%, preferably 1 to 10%, and more preferably 2 to 8%. In case when the area ratio of the alumina grains is too high, the smoothness of the electrode layer is impaired and the dielectric constant is increased. In case when the area ratio of the alumina grains is too low, the function as the filler may not be exhibited and the strength may not be improved. Therefore, in order to lower the dielectric constant, the area ratio of the alumina grains is preferably low, while when the improvement of the strength of the sintered body is prioritized, the area ratio of the alumina grains is preferably high. Therefore, in the embodiment in which the improvement of the strength of the sintered body is prioritized, the area ratio of the alumina grains may be 8 to 12%, 10 to 12% or 8 to 10%. In order to lower the dielectric constant, the area ratio of the alumina grains may be 0.05 to 2%, 0.05 to 1%, or 1 to 2%.

The area ratio of the zirconia grains on the observation surface is 0.05 to 6%, preferably 0.05 to 5%, more preferably 1 to 5%, and particularly preferably 2 to 5%. In case when the area ratio of the zirconia grains is too high, the dielectric constant of the sintered body increases, which may become difficult to use in the high frequency range. If the area ratio of the zirconia grains is too low, the function as the filler is not exhibited and the strength may not be improved in some cases. Therefore, in the embodiment in which the improvement of the strength of the sintered body is prioritized, the area ratio of the zirconia grains may be 5 to 6%. In order to lower the dielectric constant, the area ratio of the zirconia grains may be 0.05 to 2% or may be 0.05 to 1%.

The area ratio of the alumina grains and the same of the zirconia grains on the observation surface are in a total of 0.1% or more, preferably 1 to 18%, more preferably 2 to 12%, and particularly preferably 3 to 10%. In case when the sum of the area ratio of the alumina grains and the same of the zirconia grains is too high, the dielectric constant increases and it may become difficult to use in the high frequency range. If the total area ratio is too low, the function as the filler is not exhibited and the strength may not be improved.

The alumina grains on the cross section of the sintered body preferably have a grain diameter in a predetermined range. 95% or more grains, more preferably 98% or more grains, and particularly preferably 100% grains in substantial are preferably in the range of 0.05 to 4 μm by a circle equivalent diameter. If the grains are too small, the function as the filler will not be developed and the strength cannot be improved in some cases. Also, if excessively large grains are included, the smoothness of the electrode layer may be impaired.

In the present embodiment, alumina is preferably α-alumina considering its property that alumina does not melt into the glass phase at a firing temperature and remains as the filler.

The zirconia grains on the cross section of the sintered body preferably have a grain diameter in a predetermined range, and it is preferably 95% or more, further preferably 98% or more, and particularly preferably 100% grains in substantial show a circle equivalent diameter of 0.05 to 1 μm. If the grain is too small, the function as the filler will not be developed and the strength cannot be improved in some cases. While, if the grains excessive in size are included, the smoothness of the electrode layer may be impaired.

In the present embodiment, zirconia is not particularly limited, but it can be used in the form of such as a monoclinic zirconia, a partially stabilized zirconia (a mixed crystal of tetragonal and monoclinic crystal) or a stabilized zirconia (a cubic crystal), and may be used in combination thereof, if necessary. Zirconia melts at firing temperature and a small amount of zirconium may be incorporated into the glass phase. However, not all zirconia melts but some remains in the sintered body as zirconia. Remaining grains can be confirmed by STEM-EDS, and the peak of zirconia can be observed with XRD if the area ratio is at least 1%.

Here, the "area ratio" of the grain is the ratio of the cross-sectional area of the specific grain to the total area of the observation visual field on the cross section, and is expressed in percentage. "Circle equivalent diameter" defines the diameter of a circle having the same area as the projected area of the grain, and also referred to as "Heywood diameter". The area ratio and circle equivalent diameter can be obtained from the image with STEM-EDS. The specific measuring method will be described hereinafter.

Further, the glass ceramics sintered body according to the present embodiment may further include silica grains in the ceramics phase. The silica grain has a dielectric constant "ε" of 3.8 and has the effect of lowering the dielectric constant of the sintered body. However, when the silica grains are excessively included, the strength of the sintered body tends to decrease.

Therefore, the area ratio of the silica grains on the observation surface is preferably 25 to 45%, more preferably 25 to 40%, and particularly preferably 30 to 35%. In case when the area ratio of the silica grains is too low, the dielectric constant of the sintered body is hardly lowered; while when too high, the strength may decrease.

The silica grains on the cross section of the sintered body preferably have a grain diameter in a predetermined range, and it is preferably 95% or more, further preferably 98% or more, and particularly preferably 100% grains in substantial show a circle equivalent diameter of 0.2 to 4 μm. If the grain is too small, the surface area of the powder becomes too large, and makes it difficult to form a paint. While, if excessively large grains are included, the smoothness of the electrode layer may be impaired.

The silica is not particularly limited in the present embodiment, but it can be used in the form of such as α-quartz (a crystalline silica) or quartz glass (an amorphous silica), and may be used in combination thereof, if necessary.

In the present embodiment, the glass phase includes $MO-SiO_2-Al_2O_3-B_2O_3$ based glass. The $MO-SiO_2-Al_2O_3-B_2O_3$ based glass is a borosilicate glass, has a low dielectric constant, and can be sintered at a low temperature; thus, said glass is especially preferable when the sintered body is applied to an inductor element. Here, "M" may be one or more kinds selected from alkaline earth metals including Mg, Ca, Sr and Ba, preferably "M" may include Ca and one or more kinds selected from Mg, Sr and Ba, and particularly preferably "M" may include Ca and Sr. Accordingly, particularly preferred MO includes CaO and SrO. Further, it is preferable that the glass has a glass transition point of 700 to 850° C. The glass transition point is measured by a thermomechanical analyzer: TMA.

The $MO-SiO_2-Al_2O_3-B_2O_3$ based glass after sintering is mainly composed of MO, $SiO_2$, $Al_2O_3$ and $B_2O_3$, and a part of alumina, zirconia or silica used as the filler may be incorporated in the glass phase. Therefore, in some cases, the composition of the glass phase after sintering may not agree with the composition of the glass grains used as a raw material.

The preferable glass phase after sintering may include, in terms of oxide by STEM-EDS analysis described hereinafter, 4 to 14 mass %, and more preferably 5 to 10 mass % of MO, in which "M" is an alkaline earth metal,
3 to 10 mass %, and more preferably 4 to 8 mass % of $Al_2O_3$,
70 to 90 mass %, and more preferably 75 to 85 mass % of $SiO_2$, and
2 to 12 mass %, and more preferably 3 to 8 mass % of $B_2O_3$.

Furthermore, zirconia balls used as media when mixing the raw materials or zirconium derived from the filler zirconia may be incorporated in the glass phase.

Therefore, the glass phase may include $ZrO_2$ in an amount of 2 mass % or less, preferably 1 mass % or less in terms of oxide.

The glass phase includes $Al_2O_3$. Thus, the glass phase is strongly bonded to the alumina grains used as the filler, and contributes to the improvement of the strength of the sintered body.

Further, the glass may include other components within a range not disturbing the effect of the present invention, and a total content of said other components in the glass is preferably 2 mass % or less. Examples of the other components include such as $K_2O$, $Na_2O$, and etc.

The above-mentioned $MO$-$SiO_2$—$Al_2O_3$—$B_2O_3$ based glass can be fired at a low temperature, can realize a low dielectric constant and a high strength by mixing the alumina grains and the zirconia grains, and realizes a high Q Value when made to an electronic component.

(Manufacturing Method)

The glass ceramics sintered body of the invention is obtained by mixing the glass raw material, the alumina particles, the zirconia particles and, when necessary, the silica particles, and sintering thereof.

$MO$-$SiO_2$—$Al_2O_3$—$B_2O_3$ based glass, prepared so that the sintered composition satisfying the glass composition mentioned above, is used as the glass raw material. The particle diameter of the glass raw material is not particularly limited, but D90 is preferably 1 to 5 μm, and more preferably 2 to 4 μm, when measured by a laser diffraction type particle size distribution meter. When manufacturing the electronic component having an internal electrode layer including Ag, it is preferable to use the glass raw material which can be sintered at 950° C. or less. The applied glass is not limited to one kind, and a plurality of glass raw materials having different compositional ratios may be used. Glasses other than the $MO$-$SiO_2$—$Al_2O_3$—$B_2O_3$ based glass may be used in combination within an amount not excessively raising the sintering temperature.

The raw material alumina particles are preferably α-alumina having a high melting point, since the raw material alumina particles do not melt into the glass phase even after the sintering step, and partly remains so as to form the ceramics phase. The particle diameter is not particularly limited, but it is preferable to have a predetermined circle equivalent diameter on the cross section of the sintered body. Therefore, D90 of the raw material alumina particles is preferably 1 to 3 μm, and more preferably 1.5 to 2 μm, when measured by the laser diffraction type particle size distribution meter.

The raw material zirconia particles can be used in the form of such as a monoclinic zirconia, a partially stabilized zirconia (a mixed crystal of tetragonal and monoclinic crystal) or a stabilized zirconia (a cubic crystal), and if necessary, may be used in combination thereof. Zirconia melts at firing temperature and a small amount of zirconium may be incorporated into the glass phase. However, not all zirconia melts but remains in the sintered body as zirconia. It is preferable that the remaining zirconia particles have a predetermined circle equivalent diameter on the cross section of the sintered body. Therefore, D90 of raw material zirconia particles is preferably 0.1 to 4 μm, and more preferably 0.1 to 2 μm, when measured by the laser diffraction type particle size distribution meter.

The raw material silica particles can be used in the form of such as α-quartz (the crystalline silica) or quartz glass (the amorphous silica), and if necessary, may be used in combination thereof. The silica melts at the firing temperature and a small amount of silicon may be incorporated into the glass phase. However, not all the silica melts but remains in the sintered body as silica. It is preferable that the remaining silica particles have a predetermined circle equivalent diameter on the cross section of the sintered body. Therefore, D90 of the raw material silica particles is preferably 1.5 to 4 μm and more preferably 2 to 3 μm, when measured by the laser diffraction type particle size distribution meter.

The method for manufacturing the glass ceramics sintered body of the invention will be explained in more detail, taking the method for manufacturing the multilayer chip coil 1 shown in FIG. 1 as an example.

The multilayer chip coil 1 shown in FIG. 1 can be manufactured by a general method for manufacturing using the above-mentioned raw materials. That is, the glass ceramics paste, obtained by kneading the above-mentioned raw material particles with the binder and the solvent, is alternately printed and laminated with the conductive paste including such as Ag, and then firing thereof to obtain the chip element body 4 having the glass ceramics sintered body of the invention (printing method).

Alternatively, a green sheet may be prepared using the glass ceramics paste, an internal electrode paste may be printed on the surface of the green sheet, and the chip element body 4 may be formed by laminating and firing thereof (a sheet method). In either case, after forming the chip element body 4, the terminal electrode 5 may be formed by baking, plating, and etc.

The contents of the binder and the solvent in the glass ceramics paste are not particularly limited, and for example, the contents of the binder and the solvent can be set approximately in the range of 5 to 25 wt % and 30 to 80 wt %, respectively. In addition, the paste can include dispersants, plasticizers, dielectrics, insulators, and etc. in the range of 20 wt % or less when necessary. A conductor paste, including such as Ag, can also be manufactured in the same manner. Although the firing conditions are not particularly limited, when such as Ag is included in the internal electrode layer, the firing temperature is preferably 950° C. or less, and more preferably 920° C. or less. The firing time is not particularly limited; however, alumina, zirconia and silica used as the filler melt and sometimes enter the glass phase when fired at a high temperature for a long time. Therefore, the firing time is preferably approx. 0.5 to 10 hours, and more preferably approx. 1 to 5 hours, though it depends on the firing temperature.

The glass ceramics sintered body of the embodiment, by using alumina and zirconia as the filler, the filler amount can be reduced and the dielectric constant can be lowered. Furthermore, even when the filler amount is small, the glass ceramics sintered body having a sufficient strength can be obtained, since alumina and zirconia have high wettability with respect to the glass phase. Since the filler amount can be suppressed, the interface between the sintered body and the internal electrode can be smoothed, and the Q value of the high frequency inductor can also be expected to be improved. Furthermore, since a sufficient strength can be secured by alumina and zirconia, a relatively large amount of low dielectric constant silica can be mixed and the dielectric constant of the sintered body can be further reduced. In addition, according to the glass raw material and the filler raw material of the preferred embodiment, a glass ceramics sintered body showing a high sinterability, which shows a sufficient density even when sintered at a low temperature of preferably approx. 840 to 950° C., and more preferably approx. 870 to 950° C. Therefore, it can be suitably used as the ceramics layer of the coil electronic component, e.g. a multilayer chip coil using Ag as a conductor, which is required to be sintered at a low temperature.

The present invention is not limited to the above-described embodiments, and can be variously modified within the scope of the present invention.

Further, the glass ceramics sintered body according to the present embodiment can also be used such as a coil element of a semiconductor device. As the coil element according to the present invention, for example, a coil component, in which the glass ceramics sintered body according to the present invention is thinned and incorporated in a substrate of such as a semiconductor device, can be mentioned.

Further, the glass ceramics sintered body according to the present embodiment can be suitably used as an interlayer material for high frequency coils.

The glass ceramics sintered body according to the present embodiment has a low dielectric constant and sufficient strength. Thus, it is particularly preferable as the interlayer material constituting the ceramics layers 2 between the internal electrode layers 3, 3.

According to the glass ceramics sintered body of the present embodiment, it is possible to smoothen the sintered body after firing and the internal electrode interface, and to obtain a smooth internal electrode layer with little unevenness. Thus, it is possible to realize a high Q value in the high frequency region as the entire coil electronic part. The glass ceramics sintered body is particularly suitable as a high frequency coil used particularly in a frequency region of one GHz or more.

In the above embodiment, the ceramics layers 2 of the coil electronic component 1 are formed with the same material, but it is not always necessary to be the same. As described above, the glass ceramics composition of the embodiment is particularly suitable as an interlayer material constituting the ceramics layers 2 between the internal electrode layers 3, 3. The ceramics layers 2, not in contact with the coil conductor 30, may be made of the other ceramic material.

EXAMPLES

Hereinafter, the present invention will be described based on more detailed examples, but the present invention is not limited thereto.

$CaO$—$SrO$—$SiO_2$—$Al_2O_3$—$B_2O_3$ based glass, $CaO$—$SrO$—$SiO_2$—$B_2O_3$ based glass (Sample No. 21) and $CaO$—$BaO$—$SiO_2$—$Al_2O_3$—$B_2O_3$ based glass (Sample No. 27) were prepared as the glass raw material. Alumina particles (D 90: 1.5 μm), zirconia particles (D 90: 0.8 μm) and silica particles (D 90: 3 μm) were prepared as the filler raw material. Then, each was weighed.

Next, the preliminarily weighed raw materials were wet mixed with a solvent (99% methylated ethanol) using a ball mill (the media are zirconia balls) for 24 hours to obtain a raw material slurry. This raw material slurry was dried in a dryer until the solvent disappeared, and a glass ceramics material was obtained.

Next, 2.5 parts by weight of an acrylic resin based binder (Elvacite manufactured by Du Pont) as a binder was added to 100 parts by weight of the obtained glass ceramics material, granulated thereof, and sized with a 20 mesh sieve to obtain granules. The granules were pressure-molded at a pressure of 74 MPa (0.75 ton/$cm^2$) to obtain a molded article having a 179 disc shape (the size=a diameter of 17 mm and a thickness of 8.5 mm). Subsequently, the obtained molded body was fired in an air at 900° C. for two hours, and a sintered body was obtained.

Next, various properties were evaluated on the obtained sintered body under the following conditions. The results are shown in Table 1.

[Area Ratio and Circle Equivalent Diameter]

The area ratios of the alumina grains, the zirconia grains and the silica grains dispersed in the glass phase of the sintered body and the circle equivalent diameter thereof were measured by STEM-EDS according to the following procedure.

1. Image Analysis Software and Image Analysis Method

The area ratios of alumina grains, zirconia grains and silica grains contained in the sintered body were obtained by the following method. The area of each grain with respect to the viewing area of the mapping image was obtained by applying Mac-View, image analysis software manufactured by Mountech Co., Ltd. to the mapping images by STEM-EDS and then the ratio thereof was calculated. By tracing the outer periphery of the place judged to be the grain by referring to the mapping image, with a pen, the area of the grain and the circle equivalent diameter thereof were calculated.

2. Separation of the Glass Phase, Alumina, Zirconia and Silica

Figure 2:
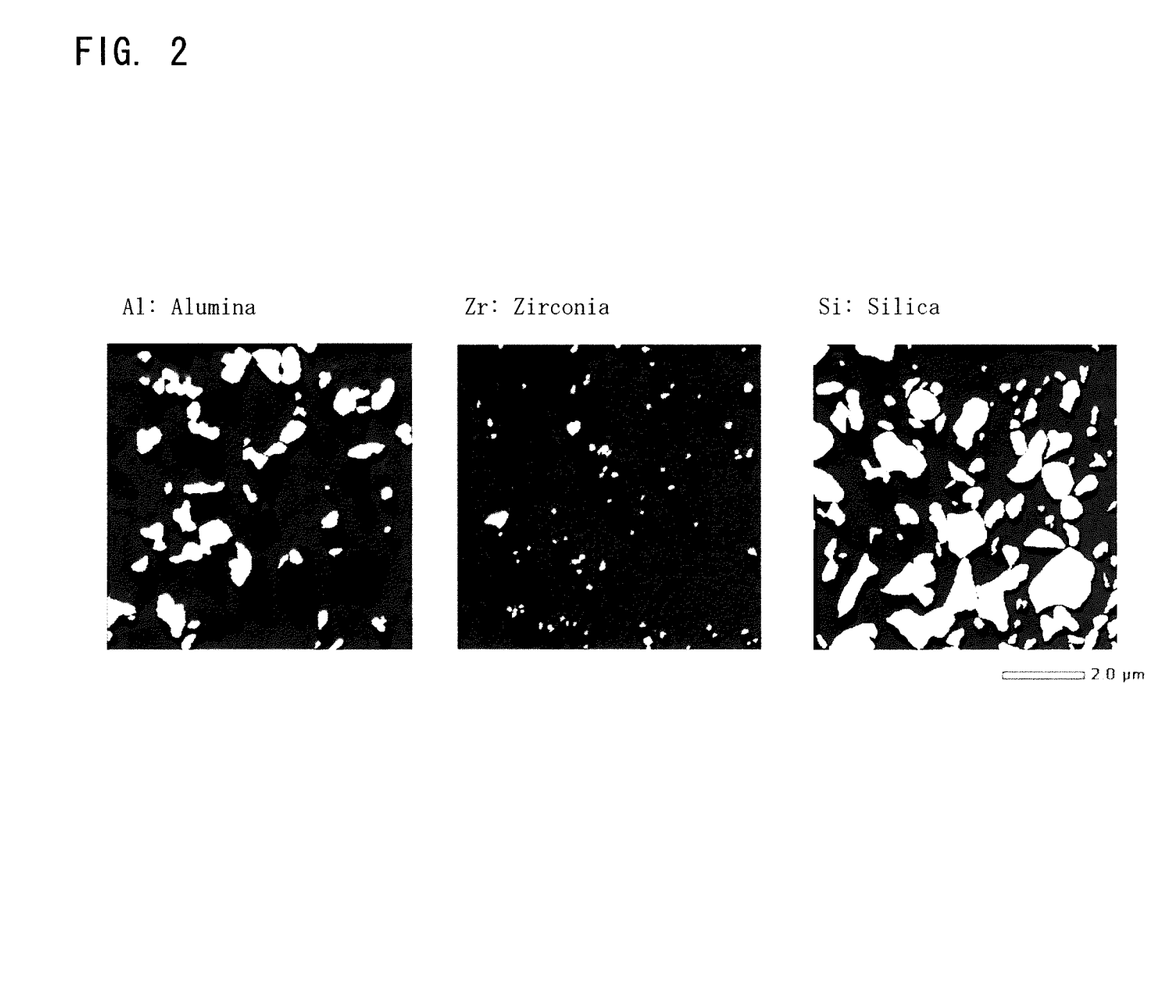
FIG. 2 is mapping images of Al, Zr and Si by STEM-EDS considering the sintered body of sample No. 7 according to the present example.

STEM observation and EDS analysis were performed by sampling from the sintered body with FIB (Nova 200, manufactured by FEI Co.) and using STEM-EDS (JEOL-2200FS, manufactured by JEOL Ltd.) at an acceleration voltage of 200 kV. Images as shown in FIG. 2 were obtained for each element by EDS mapping. Places of a high Al concentration was judged to be alumina grains, and places of a high Zr concentration was judged to be zirconia grains. In addition, places of a high Si concentration was judged to be silica grains.

Figure 3:
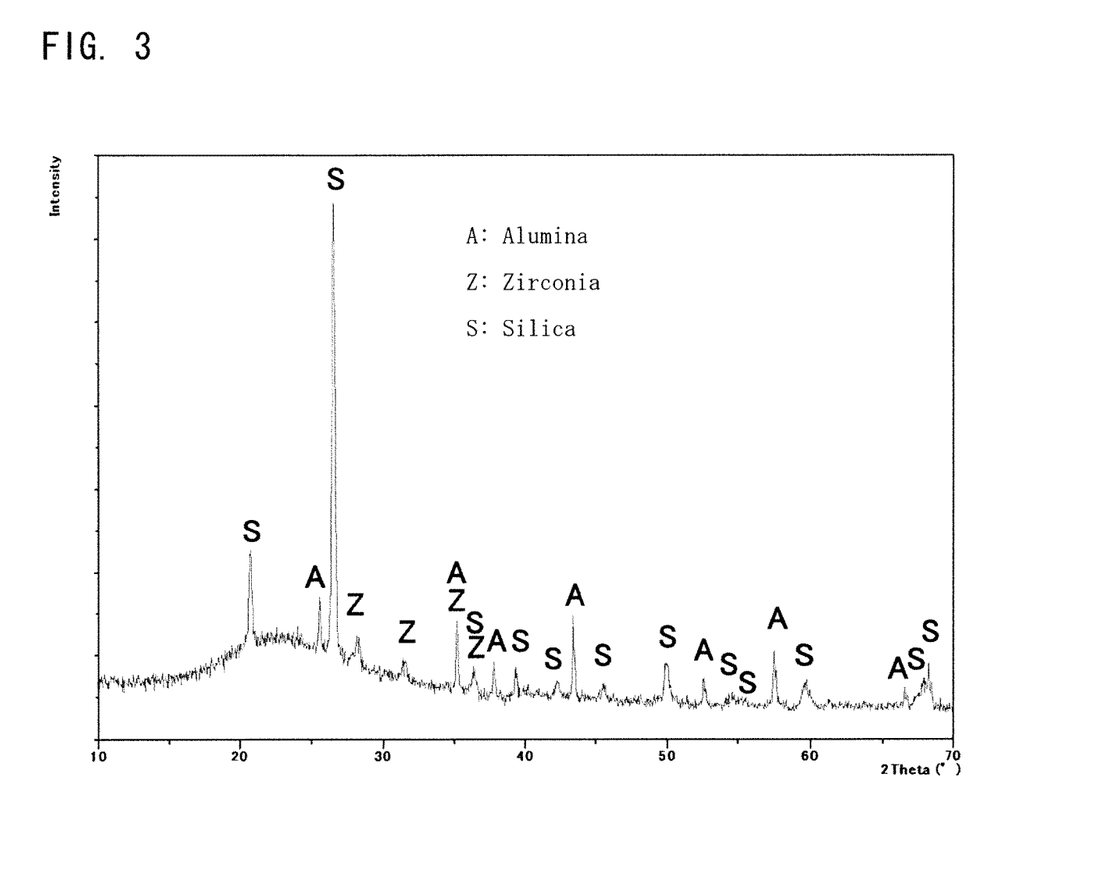
FIG. 3 is XRD results considering the sintered body of sample No. 7 according to the present example.

The sintered body was measured under the conditions of X-ray output at 45 kV and 40 mA using XRD (X'PertPro manufactured by PANalytical Co.), and it was confirmed that the crystal phase was made only of α-alumina, monoclinic zirconia and α-quartz as shown in FIG. 3. An amorphous halo pattern can also be confirmed, which shows that the places except α-alumina, monoclinic zirconia and α-quartz are made of the glass phase. In case when the quartz glass (the amorphous silica) was used as the silica raw material, there was no α-quartz peak and it became the same halo pattern as the glass phase. Therefore, it can be confirmed that these grains were alumina, zirconia and silica.

Three fields of view were analyzed for one sample and the average value was calculated for each grain. The average value was determined as the area ratio of alumina grains, zirconia grains and silica grains.

[Glass Phase Composition]

By EDS mapping, it was confirmed that the alkaline earth metal was continuously present in the regions other than alumina, zirconia and silica, and was judged to be the glass phase. Crystal peaks other than alumina, zirconia and silica were not confirmed and only halo patterns derived from the amorphous phase existed when using XRD. Therefore, it

[Insulation Resistance]

The insulation resistance (unit: Ω·m) was calculated from the resistance value and the size, after applying an In—Ga electrode on both faces of the obtained sintered body and measuring the DC resistance value. The measurement was carried out under the conditions of 25V for 30 seconds, using an insulation resistance meter (4329A manufactured by HEWLETT PACKARD). In the example, samples with $1 \times 10^7$ Ω·m or more were evaluated as good.

[Bending Strength]

Using a universal material tester 5543 manufactured by INSTRON Co., Ltd., the bending strength of the sintered body was measured by a three-point bending test. A distance between the points was 15 mm. In the example, samples with 80 MPa or more were evaluated as good.

TABLE 1

| Sample No | Glass Phase Composition (wt %, 100 wt % in total) | | | | | | | | Area Ratio of Image analysis (%) | | Sinter-ability | Relative Dielectric Constant | Bending Strength (MPa) | Insulation Resistance (Ω·m) |
|---|---|---|---|---|---|---|---|---|---|---|---|---|---|---|
| | $B_2O_3$ | $Al_2O_3$ | $SiO_2$ | CaO | SrO | BaO | $ZrO_2$ | Others | Alumina | Zirconia | | | | |
| 1* | 6.0 | 7.7 | 76.0 | 2.8 | 6.1 | 0.0 | 0.1 | 1.3 | 0.05 | 0 | Good | 4.56 | 75 | 9.1E+10 |
| 2 | 6.1 | 8.0 | 76.0 | 2.6 | 6.0 | 0.0 | 0.1 | 1.2 | 0.05 | 0.05 | Good | 4.57 | 81 | 1.2E+11 |
| 3 | 6.0 | 8.0 | 75.9 | 2.6 | 6.2 | 0.0 | 0.1 | 1.2 | 1 | 0.05 | Good | 4.62 | 86 | 2.7E+11 |
| 4 | 6.3 | 8.2 | 75.2 | 2.5 | 6.0 | 0.0 | 0.5 | 1.3 | 2 | 1 | Good | 4.85 | 89 | 3.6E+11 |
| 5 | 6.2 | 8.4 | 75.0 | 2.6 | 5.8 | 0.0 | 0.6 | 1.4 | 6 | 1 | Good | 4.90 | 95 | 3.2E+11 |
| 6 | 5.8 | 8.7 | 75.4 | 2.4 | 5.9 | 0.0 | 0.4 | 1.4 | 10 | 1 | Good | 5.01 | 124 | 3.2E+11 |
| 7 | 5.7 | 9.0 | 75.4 | 2.5 | 5.8 | 0.0 | 0.3 | 1.3 | 11 | 1 | Good | 5.25 | 140 | 4.5E+11 |
| 8 | 5.7 | 9.0 | 73.9 | 2.6 | 5.9 | 0.0 | 1.7 | 1.2 | 12 | 5 | Good | 5.29 | 148 | 4.0E+11 |
| 9* | 5.8 | 9.3 | 74.9 | 2.5 | 5.9 | 0.0 | 0.3 | 1.3 | 13 | 1 | Good | 5.34 | 159 | 2.8E+11 |
| 10* | 6.4 | 7.8 | 75.2 | 3.0 | 6.1 | 0.0 | 0.1 | 1.4 | 6 | 0 | Good | 4.71 | 75 | 4.8E+11 |
| 11* | 6.1 | 7.9 | 75.9 | 2.6 | 6.1 | 0.0 | 0.1 | 1.3 | 12 | 0 | Good | 4.72 | 78 | 8.2E+11 |
| 12 | 6.6 | 7.9 | 75.4 | 2.7 | 5.9 | 0.0 | 0.1 | 1.4 | 6 | 0.05 | Good | 4.70 | 81 | 4.5E+11 |
| 13 | 6.4 | 8.2 | 74.9 | 2.4 | 5.8 | 0.0 | 1.1 | 1.2 | 6 | 3 | Good | 4.85 | 86 | 9.2E+11 |
| 14 | 6.3 | 8.3 | 73.8 | 2.5 | 5.9 | 0.0 | 1.8 | 1.4 | 6 | 5 | Good | 4.90 | 95 | 1.2E+12 |
| 15 | 6.0 | 8.1 | 73.7 | 2.6 | 5.9 | 0.0 | 2.4 | 1.3 | 6 | 6 | Good | 4.92 | 94 | 1.5E+12 |
| 16 | 6.1 | 8.1 | 73.5 | 2.7 | 6.0 | 0.0 | 2.2 | 1.4 | 12 | 6 | Good | 5.32 | 145 | 1.6E+12 |
| 17* | 2.0 | 7.8 | 77.1 | 3.9 | 7.9 | 0.0 | 0.1 | 1.2 | 6 | 0 | Good | 4.90 | 77 | 5.7E+11 |
| 18 | 2.0 | 7.8 | 76.6 | 3.9 | 7.8 | 0.0 | 0.7 | 1.2 | 6 | 2 | Good | 4.91 | 95 | 4.3E+12 |
| 19* | 2.0 | 8.1 | 76.2 | 3.9 | 7.9 | 0.0 | 0.7 | 1.2 | 13 | 2 | Good | 5.36 | 148 | 5.8E+12 |
| 20 | 11.8 | 7.9 | 72.8 | 4.0 | 1.5 | 0.0 | 0.7 | 1.3 | 6 | 2 | Good | 4.82 | 82 | 5.2E+11 |
| 21* | 6.0 | 0.0 | 83.4 | 2.2 | 7.5 | 0.0 | 0.1 | 0.8 | 6 | 2 | Good | 4.72 | 72 | 8.5E+10 |
| 22 | 6.2 | 3.2 | 79.4 | 2.6 | 6.6 | 0.0 | 0.7 | 1.3 | 6 | 2 | Good | 4.81 | 83 | 6.2E+11 |
| 23 | 6.2 | 9.5 | 69.9 | 4.2 | 8.4 | 0.0 | 0.6 | 1.2 | 6 | 2 | Good | 4.92 | 98 | 8.8E+11 |
| 24 | 4.5 | 7.2 | 81.0 | 2.7 | 2.5 | 0.0 | 0.8 | 1.3 | 6 | 2 | Good | 4.78 | 82 | 7.4E+10 |
| 25 | 5.0 | 7.4 | 71.3 | 6.3 | 7.8 | 0.0 | 0.8 | 1.4 | 6 | 2 | Good | 4.98 | 89 | 2.1E+12 |
| 26 | 2.0 | 3.5 | 88.2 | 2.1 | 2.2 | 0.0 | 0.7 | 1.3 | 6 | 2 | Good | 4.79 | 82 | 6.5E+11 |
| 27 | 5.8 | 7.4 | 74.0 | 4.1 | 0.0 | 6.5 | 0.8 | 1.4 | 6 | 2 | Good | 4.85 | 86 | 9.2E+11 | was judged that this region was not crystallized and formed glass phase. In order to investigate the composition of the glass phase, five different points in the glass phase were point analyzed and the average value thereof was obtained.

[Sinterability]

The sinterability of the glass ceramics material was evaluated by observing the fracture surface of the sintered body by using FE-SEM. The samples with few pores and a sufficiently advanced densification were evaluated as good, while samples with insufficient densification were evaluated as bad.

[Relative Dielectric Constant]

The relative dielectric constant (without unit) was measured by the resonance method (JIS R 1627) using a network analyzer (PNA N 5222 A manufactured by Agilent Technologies). In the example, samples with the relative dielectric constant of 5.3 or less were evaluated as good.

In the table, sample numbers marked with "*" indicate comparative examples. From the results of STEM-EDS, on the cross section of the sintered body, it was confirmed that 95% or more of the alumina grains showed the circle equivalent diameter of 0.05 to 4 μm, 95% or more of the zirconia grains showed the circle equivalent diameter of 0.05 to 1 μm, and 95% or more of the silica grains showed the circle equivalent diameter of 0.2 to 4 μm. In addition, the area ratio of the silica grains was in the range of 25 to 45% in any sample.

From the above results, it is understood that the glass ceramics sintered body according to the present invention achieved both a low relative dielectric constant and a high bending strength. Although the relative dielectric constant was low, the bending strength was low when the zirconia particles were not mixed (Sample 1). By adding a small amount of zirconia particles, the bending strength improved (Samples 2, 3 and 12). As the mixing amount of alumina particles and zirconia particles increased, both bending strength and relative dielectric constant increased. Also, if alumina particles were mixed excessively (samples 9 and 19), the bending strength became high but the relative dielectric constant rose excessively. From the viewpoint of achieving an appropriate relative dielectric constant, the upper limit of the mixing amount of alumina particles became the area ratio of approximately 12%. In case when the zirconia particles were not mixed (Samples 10, 11 and 17), the bending strength did not improve. The upper limit of improving the bending strength by mixing zirconia particles became the area ratio of approximately 6% (Samples 15 and 16). Also, when zirconia particles were not mixed, sufficient improvement in strength could not be achieved, even though alumina particles were mixed (Sample 17). In case when $Al_2O_3$ was not included in the glass phase, sufficient improvement in strength could not be achieved even though alumina particles were blended as the filler (Sample 21).

REFERENCES OF THE NUMERALS

1 . . . Multilayer chip coil
2 . . . Ceramics layer
3 . . . Internal electrode layer
   3a, 3b . . . Extracting electrodes
   30 . . . Coil conductor
4 . . . Chip element body
5 . . . Terminal electrode

The invention claimed is:

1. A coil element comprising a glass ceramics sintered body comprising a glass phase and a ceramics phase dispersed in the glass phase,
   wherein the ceramics phase comprises alumina grains and zirconia grains,
   the glass phase comprises an $MO-Al_2O_3-SiO_2-B_2O_3$ based glass, where M is an alkaline earth metal, and
   an area ratio of the alumina grains is 0.05 to 8% and the area ratio of the zirconia grains is 0.05 to 6% on the cross section of the sintered body.

2. The coil element according to claim 1, wherein 95% or more of the alumina grains are in the range of 0.05 to 4 μm by a circle equivalent diameter, and 95% or more of the zirconia grains are in the range of 0.05 to 1 μm by the circle equivalent diameter, on the cross section of the sintered body.

3. The coil element according to claim 1, wherein the ceramics phase further comprises silica grains, and
   the area ratio of the silica grains is 25 to 45% on the cross section of the sintered body.

4. The coil element according to claim 3, wherein 95% or more of the silica grains are in the range of 0.2 to 4 μm by the circle equivalent diameter on the cross section of the sintered body.

5. The coil element according to claim 1, wherein the glass phase comprises:
   4 to 14 mass % of MO, where M is the alkaline earth metal,
   3 to 10 mass % of $Al_2O_3$,
   70 to 90 mass % of $SiO_2$,
   2 to 12 mass % of $B_2O_3$, and
   2 mass % or less of $ZrO_2$.

6. The element according to claim 1, wherein MO comprises CaO and SrO.

7. A coil electronic component comprising a ceramics layer made of a glass ceramic sintered body, the glass ceramics sintered body comprising a glass phase and a ceramics phase dispersed in the glass phase,
   wherein the ceramics phase comprises alumina grains and zirconia grains,
   the glass phase comprises an $MO-Al_2O_3-SiO_2-B_2O_3$ based glass, where M is an alkaline earth metal, and
   an area ratio of the alumina grains is 0.05 to 8% and the area ratio of the zirconia grains is 0.05 to 6% on the cross section of the sintered body.

8. An electronic component formed by laminating a coil conductor and the ceramic layer, the coil conductor comprising Ag, and the ceramics layer being made of a glass ceramics sintered body, the glass ceramics sintered body comprising a glass phase and a ceramics phase dispersed in the glass phase,
   wherein the ceramics phase comprises alumina grains and zirconia grains,
   the glass phase comprises an $MO-Al_2O_3-SiO_2-B_2O_3$ based glass, where M is an alkaline earth metal, and
   an area ratio of the alumina grains is 0.05 to 8% and the area ratio of the zirconia grains is 0.05 to 6% on the cross section of the sintered body.

* * * * *